March 12, 1940.  E. DOZLER  2,193,623
SUPPLY LINE FOR ELECTRIC VEHICLES
Filed April 22, 1938
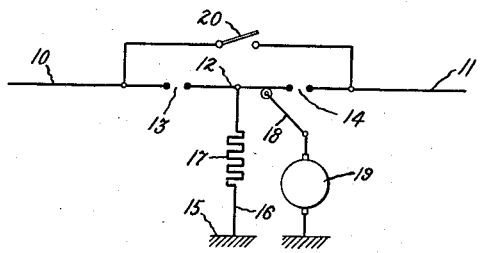
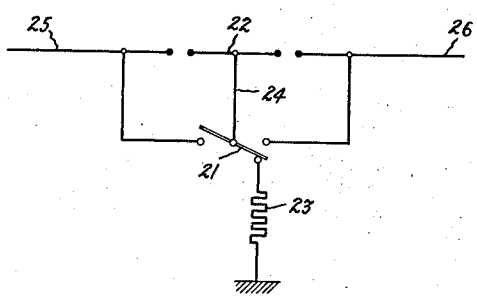
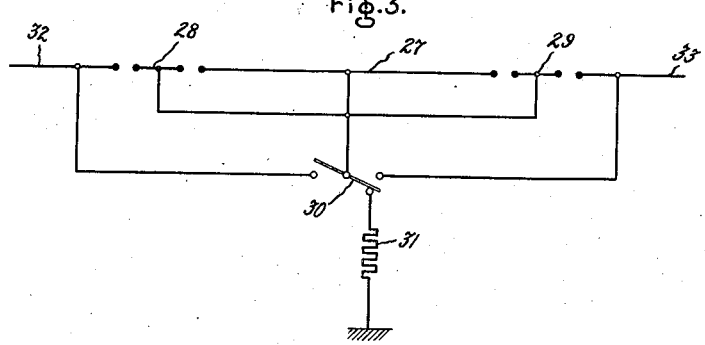
Inventor:
Ernst Dozler,
by Harry E. Dunham
His Attorney.

Patented Mar. 12, 1940

2,193,623

UNITED STATES PATENT OFFICE 2,193,623

SUPPLY LINE FOR ELECTRIC VEHICLES

Ernst Dozler, Berlin-Steglitz, Germany, assignor to General Electric Company, a corporation of New York Application April 22, 1938, Serial No. 203,695
In Germany April 29, 1937

1 Claim. (Cl. 104—149)

My invention relates to contact power supply lines for electric vehicles, more particularly to means for dividing the supply line into sections, and has for its object the provision of means for providing for regenerative braking while the trolley or other contact current-collecting means is passing over the divider between the sections.

It is well known in connection with contact power supply lines, such as a trolley wire or third rail, to separate the supply line into sections where a plurality of supply sources or substations are provided. These separating points between two adjacent substation sections are formed in a well-known manner so that non-conducting parts of a predetermined length are arranged over which the current-collecting device on the railway car passes. When the current is from below by means of a third rail, air separating points may be provided between the sections of the supply line. In the event that the electric vehicle is provided with several current-collecting devices which are connected together on the current supply side, then these divisions or dividers between the sections of the supply line must be of such length as to avoid the connection together of the two adjacent supply line sections by the plurality of current-collecting devices.

When using electrical regenerative braking, these points of sub-division are very unsatisfactory since an interruption of the braking effect occurs when the current collector on the vehicle passes over the divider portion, and, furthermore, excess voltages in the motors of the vehicle incident to this interruption of the regenerative braking cause protective devices to be released which delay a subsequent continuance of regenerative braking when the collecting devices of the vehicle arrive on the next supply line section.

In order to avoid these disadvantages in accordance with this invention, a conductor forming a divider is inserted at the point of sub-division of the supply line, this conductor being insulated from the two adjacent supply line sections and connected to the earth through a resistance. This arrangement prevents interruption of the braking effect, since the motors continue to supply current through this resistance.

It is furthermore contemplated, in accordance with the invention, that this resistance shall have an ohmic value selected to give a dynamic braking energy characteristic as near as possible the same as the regenerative braking characteristic. In that case the passage of the vehicle from one supply line section to another is effected almost without shock and the regenerative braking is reestablished without difficulty.

Moreover, with dividers arranged to be separately connected to a supply source to make possible the starting of the vehicle while on the divider where the substation supplies are coupled together, then a coupling switch is provided to connect the section divider either to the substation supply or through the resistance to earth.

For a more complete understanding of this invention, reference should be had to the accompanying drawing in which Fig. 1 is a diagrammatic view showing a section divider arrangement embodying this invention; Fig. 2 is a view similar to Fig. 1 showing an alternative switching arrangement for connecting the divider section to the adjacent supply line sections or through a resistance to ground; while Fig. 3 is a diagrammatic view showing connections similar to those of Fig. 2 applied to a section divider of considerable length.

Referring to Fig. 1, the contact power supply line may be either a trolley wire or a third rail. This line 10 is separated into two sections 10 and 11 at a suitable point between the sources of supply, such as substations, by means of an electrically conducting divider section 12 which is suitably insulated at the points 13 and 14 from the adjacent ends of the supply line sections 10 and 11.

This divider section 12 is preferably physically similar to the conductors of the sections 10 and 11 and, as shown, it is arranged in alignment with sections 10 and 11 so as to form mechanically a continuation of these sections over which the trolley or brakeshoe, as the case may be, on the electric vehicle, passes from one section to the other and makes electrical contact with the divider conductor 12 in passing over it.

The divider section 12 is furthermore connected electrically to the return conductor, such as the earth 15 or another trolley wire or third rail as the case may be, through an electrical connection 16 which includes a resistance 17. Thus it will be observed that when the collecting device on the vehicle, such as a trolley 18, engages the divider section 12, the motor 19 on the vehicle is connected electrically directly across the resistance 17 so as to supply dynamic braking current to the resistance 17. This maintains the electric braking action of the vehicle. Preferably the resistance 17, which may be a water resistance, has an ohmic value so selected in conformity with the voltage of the motor 19 when acting as a generator during regenerative braking that the motor 19 will supply a current through the resistance 17 approximating the value of its regenerative braking current supplied to the line section 10 or 11 in opposition to the voltage of the supply source. This provides for substantially the same electric braking action while the trolley 18 is passing over the divider section 12 whereby variations in the electric braking and consequent shocks are minimized and the operation of protective devices on the vehicle due to excess voltages is prevented.

The divider section 12 is of such length as to span the collecting devices in the event that the vehicle is provided with a plurality of such devices electrically connected together but spaced apart along the supply line. This prevents the electrical connection together through the collecting devices of the supply sections 10 and 11 as would occur if the divider section 12 were of insufficient length to span the collecting devices. A switch 20 is provided by means of which the two sections 10 and 11 may be electrically connected together when that is desirable.

It will be understood that if the section 10 or the section 11 is electrically connected momentarily to the section 12 by a plurality of collecting devices electrically connected together on a vehicle and spanning the insulated points 13 or 14, the momentary current from the supply section through the resistance 17 to ground is limited by the resistance 17 to a predetermined minimum value approximating the high speed dynamic braking current through the resistor 17.

In Fig. 2 a double-pole single-throw switch 21 is provided which normally, as shown, is in position to connect the divider section 22 through a resistance 23 to the ground, the switch being connected to the divider section 22 through a conductor 24. When the right-hand end of the switch member 21 is thrown upward, its left-hand end moving downward, connections are established through the switch between the two supply sections 25 and 26 and also through the conductor 24 from the supply sections to the divider section 22.

In Fig. 3 the divider conductor section 27 is shown of considerable length to accommodate a plurality of collecting devices on the vehicle spaced apart long distances. In accordance with this arrangement at the point of sub-division of the contact supply line, intermediate conducting sections 28 and 29 are provided, these sections being relatively short and electrically insulated from the adjoining section of the contact supply line and also from the intermediate divider section 27. By means of a switch 30 the divider section 27 may be electrically connected together with the short sections 28 and 29 through a resistance 31 to earth, as shown. By throwing this switch to its other position the two power supply sections 32 and 33 and the intermediate sections 27, 28 and 29 are all electrically connected together.

While I have shown a particular embodiment of my invention, it will be understood, of course, that I do not wish to be limited thereto, since many modifications may be made and I, therefore, contemplate by the appended claim to cover any such modifications as fall within the true spirit and scope of my invention.

What I claim as new and desire to secure by Letters Patent of the United States is:

The combination with an electric vehicle power supply line arranged to have a moving current collecting device contacting therewith to supply current to an electric vehicle arranged for electric regenerative braking when connected to said supply line, said power supply line being divided into two sections having their adjacent ends spaced apart, of an electrically conducting divider section between said spaced ends in position to form a mechanical continuation of said supply line sections but electrically insulated from said line sections, a resistance having an ohmic value such as to provide dynamic braking substantially as great as said regenerative braking for the motor of a vehicle passing over said divider section, means including a two-way switch movable to one position to connect electrically said divider section through said resistance to a return conductor and movable to another position to disconnect electrically said divider section from said resistance and to connect electrically said three sections together, said two-way switch and the electrical connections therewith being entirely independent of the connection of said supply line sections to sources of electric energy and being operable to each position without interrupting the supply of electric energy to said supply line sections.

ERNST DOZLER.